United States Patent [19]

Serini et al.

[11] Patent Number: 4,481,338

[45] Date of Patent: Nov. 6, 1984

[54] FLAME-RESISTANT POLYMER MIXTURES

[75] Inventors: Volker Serini; Werner Nouvertné; Dieter Freitag, all of Krefeld, Fed. Rep. of Germany

[73] Assignee: Bayer Aktiengesellschaft, Leverkusen-Bayerwerk, Fed. Rep. of Germany

[21] Appl. No.: 528,171

[22] Filed: Aug. 31, 1983

[30] Foreign Application Priority Data

Sep. 10, 1982 [DE] Fed. Rep. of Germany ....... 3233617

[51] Int. Cl.$^3$ ........................ C08K 3/40; C08L 21/18; C08L 69/00; C08L 87/00
[52] U.S. Cl. .................................... 525/394; 524/508; 524/537; 524/494; 525/146; 525/462; 525/468; 525/538
[58] Field of Search ............... 525/146, 462, 468, 538, 525/394; 524/508, 537, 494

[56] References Cited

U.S. PATENT DOCUMENTS

| | | | |
|---|---|---|---|
| 3,819,770 | 6/1974 | Kraft et al. | 525/146 |
| 3,987,008 | 10/1976 | Stackman | 525/538 |
| 3,992,481 | 11/1976 | Kraft et al. | 525/146 |
| 4,332,921 | 6/1982 | Schmidt et al. | 525/462 |
| 4,350,799 | 9/1982 | Schmelzer et al. | 525/538 |

FOREIGN PATENT DOCUMENTS

| | | | |
|---|---|---|---|
| 3002550 | 7/1981 | Fed. Rep. of Germany | 525/462 |
| 52-10350 | 1/1977 | Japan | 525/538 |
| 1045533 | 10/1966 | United Kingdom | 525/462 |

*Primary Examiner*—Allan M. Lieberman
*Attorney, Agent, or Firm*—Connolly and Hutz

[57] ABSTRACT

This invention relates to flame-resistant polymer mixtures of polycarbonate and polyphosphate, which mixtures may contain organic chlorine and bromine compounds, glass fibres and polytetrafluoroethylene.

7 Claims, No Drawings

FLAME-RESISTANT POLYMER MIXTURES

This invention relates to flame-resistant polymer mixtures of polycarbonate and polyphosphate, which mixtures may contain organic chlorine and bromine compounds, glass fibres and polytetrafluoroethylene.

The flame-resistant polymer mixtures according to the present invention are characterised in that they contain (a) from 25 to 99.5% by weight of a polycarbonate, the linear chains of which consist of at least 85 mol % of recurring structural units corresponding to formula (1):

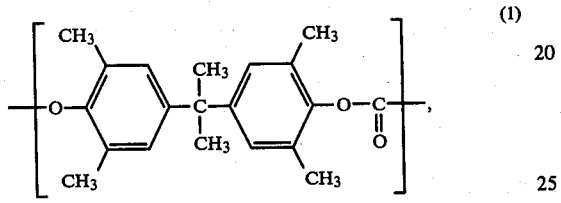

and at most 15 mol % of recurring units corresponding to formula (2):

wherein

R represents an organic radical having one or more aromatic nuclei, and —R— is bound via oxygen which is aromatically linked to —R—, but not including units corresponding to formula (1), —R— represents an o-, m- or p-phenyl radical or a radical of the formula (2a)

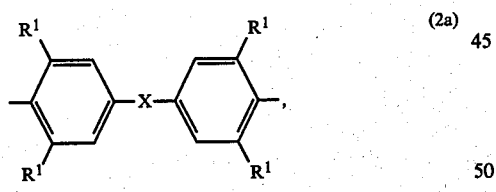

in which

R¹ represents hydrogen, halogen like chlorine and bromine, $C_1$-$C_3$-alkyl and X represents a $C_1$-$C_5$-alkylene- or alkylidene radical, a $C_3$-$C_6$-cycloalkylene- or cycloalkylidene-radical, a single bond, —S— or a radical of the formula (2b)

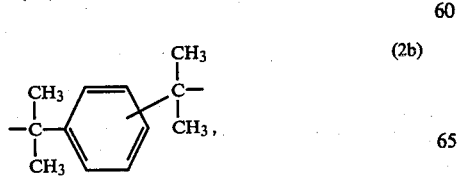

or a radical of the formula (2c)

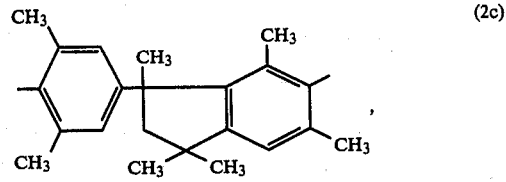

in which the two alkyl substituents may be in o-, m- or p-position to each other, with the proviso that units of formula (1) are not comprised (b) from 0.5 to 75% by weight of a branched polyphosphate which consists of at least 1 mol % of recurring structural units corresponding to the formulae (3) and/or (4):

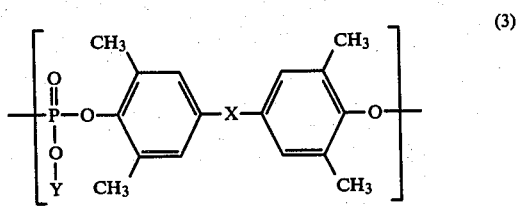

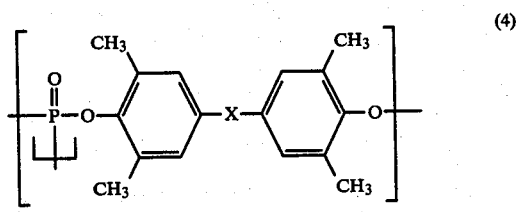

wherein

X represents a $C_1$-$C_5$ alkylene or alkylidene radical, a $C_5$-$C_6$ cycloalkylene or cycloalkylidene radical, a single bond, —S— or

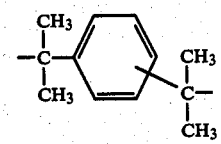

wherein the two i-propylidene groups may be in the o, m or p-position relative to each other, M represents H, Y or —R—OH, and the H of the OH groups may be at least partly replaced by metal atoms which form ionogenic groups, Y represents an alkyl-, aryl-, cycloalkyl- or aralkyl-radical, and R is as defined above, and at most 99 mol % of recurring structural units corresponding to formulae (5) and/or (6):

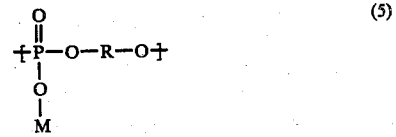

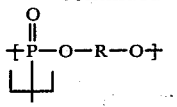

(6)

wherein R and M are as defined above, with the proviso that units of the formulas (3) and (4) are not comprised, (c) from 0 to 20 parts of one or more organic chlorine and/or bromine compounds which contain only aromatically bound chlorine and/or bromine, have a decomposition temperature of above 250° C. and do not boil under normal pressure up to at least 300° C., (d) from 0 to 100 parts of glass fibres, and (e) from 0 to 1 parts of polytetrafluoroethylene, the "parts" designations of components c, d and e relating to the total of a and b (parts=parts of (c), (d) and (e) per hundred parts of (a) and (b)). All parts are by weight.

The polycarbonate mentioned under (a) is either a copolycarbonate having at least 85% by weight of recurring structural units corresponding to formula (I) and at the most 15% by weight of recurring structural units corresponding to formula (2), or a polycarbonate consisting only of recurring structural units corresponding to formula (1).

The structural units corresponding to formula (1) are based on 2,2-bis-(3,5-dimethyl-4-hydroxyphenyl)-propane.

The structural units corresponding to formula (2) may be based on all other aromatic diols, in which the two hydroxy groups are of a phenolic nature. Therefore, they must have at least one aromatic nucleus. Examples of such aromatic dihydroxy compounds include the following: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-sulphones, α,α'-bis-(hydroxyphenyl)-diisopropylbenzenes and nuclear-alkylated and nuclear-halogenated derivatives thereof.

Suitable aromatic dihydroxy compounds are described in, for example, U.S. Pat Nos. 3,028,365; 2,999,835; 3,148,172; 3,271,368; 2,991,273; 3,271,367, 3,780,078; 3,014,891; 2,999,846; in DE-OS Nos. 2,063,050; 2,211,957; 1,570,703; 2,329,585; 2,329,646 and in the monograph "Hermann Schnell, Chemistry and Physics of Polycarbonates, Polymer Reviews, Volume 9, Interscience Publishers, New York, 1964".

Preferred polycarbonates include those which are based on crude bisphenols, as may be produced from pure 2,6-dimethylphenol and in particular from commercial 2,6-dimethylphenols contaminated with cresols, according to the processes of DE-OS No. 2,928,464 and DE-OS No. 2,928,443. They must contain at least 85% by weight of recurring structural units corresponding to formula (1).

Preferred copolycarbonates which have recurring structural units corresponding to formula (I) contain at least 90% by weight of these structural units. Polycarbonates which exclusively contain recurring structural units corresponding to formula (1) are most particularly preferred.

The polycarbonates which may be used according to the present invention are produced by known processes, for example according to the processes of DE-OS No. 2,063,050; 2,211,957; 2,901,665 and 2,901,668. These polycarbonates have molecular weights $\overline{M}_w$ (weight average) of from 10,000 to 200,000, preferably from 20,000 to 80,000, more preferably from 25,000 to 60,000 and most preferably from 30,000 to 45,000.

Chain terminators may be used in conventional quantities for adjusting the required molecular weights $\overline{M}_w$ of the aromatic polycarbonates which may be used according to the present invention. Suitable chain terminators include, for example, phenols, such as phenol, o, m, p-cresol, 2,6-dimethylphenol, p-tertiary-butylphenol and p-isooctylphenol.

The polycarbonates which may be used according to this invention may be branched. Branching is achieved by the incorporation of small quantities, preferably quantities of from 0.05 to 2.0 mol % (based on the diphenols used), of tri- or more than tri-functional compounds. Compounds which have three or more phenolic hydroxy groups are preferably used as trifunctional compounds. The production of these branched polycarbonates is described in, for example, DE-OS Nos. 1,570,533; 1,596,762; 2,116,974; 2,113,347; GB-PS Nos. 1,079,821 and 1,476,108 and in U.S. Pat. No. 3,544,514.

The branched polyphosphates which may be used according to the present invention are produced by the reaction of aromatic diols with phosphoric acid esters in the presence of basic alkaline earth metal or alkali metal compounds. The aromatic diols are generally reacted with the phosphoric acid esters as follows.

The phosphoric acid ester is introduced and melted if it is a solid. The aromatic diol is added to the liquid phosphoric acid ester and dissolved with heating. The basic alkali or alkaline earth metal compound as catalyst is then added. The release of alcohol or phenol then starts at an elevated temperature. The alcohol or phenol which is released is distilled off. The resulting polyphosphate remains.

The process is carried out analogously if several aromatic diols or several phosphoric acid esters are used. The addition sequence of the starting components may differ from that described above. Solubility of the components in each other is also not strictly necessary for the reaction, even if it is favourable. The time of addition of the catalyst once the starting components have been melted is not critical. The addition may be made before or during the melting of the starting components. It may be useful to subsequently add catalyst during the reaction to maintain an adequate reaction rate. The catalyst does not need to be dissolved, or does not need to be completely dissolved in the reaction mixture, although this may be favourable for the reaction and for the quality of the product which is obtained.

The starting components are generally melted at a temperature of from 50° to 300° C., preferably from 100° to 250° C., and more preferably from 125° to 225° C. The catalyst is preferably added once the starting components have been melted. It is particularly favourable for the start and the continuation of the reaction if the catalyst is added at a temperature of from 100° to 250° C., preferably from 125° to 225° C.

The reaction temperature is maintained as low as possible. It generally ranges from 100° to 350° C., preferably from 125° to 300° C., and more preferably from 150° to 250° C. In the starting phase in which most of the alcohol or most of the phenol (about 90%) is released, the reaction temperature is as low as possible, preferably from 100° to 250° C., and more preferably from 125° to 225° C.

Polycondensation advantageously takes place under reduced pressure, because as a result of this, the alcohol or the phenol which is released is rapidly removed from the reaction mixture. The process is generally carried out under pressures of from 600 to 0.01 mm Hg, preferably under pressures of from 400 to 0.025 mm Hg, and more preferably under pressures of from 250 to 0.05 mm Hg.

Whereas most of the alcohol or most of the phenol (about 90%) is generally released under 600 to 10 mm Hg, the residual quantities are distilled off under 10 to 0.01 mm Hg. A pressure balance which may become necessary is achieved using inert gas, for example using $CO_2$ or $N_2$, so that atmospheric oxygen is kept away from the reaction medium. The reactants are also generally melted under inert gas.

The residual content of released alcohol or phenol in the polyphosphate generally amounts to less than 2%, preferably less than 1%, more preferably less than 0.5% and most preferably less than 0.1% by weight, based on the polyphosphate which is obtained.

The minimum quantity of catalyst to be used depends on the type of atomatic diols. Whereas, when aromatic diols based on the formulae (3) and (4) are used, relatively large quantities of catalyst are to be used, when aromatic diols based in the formulae (5) and (6) are used, smaller quantities may often be used. During the reaction of aromatic diols corresponding to the formulae (3)–(6) with phosphates, from 1.0 to 0.0001, preferably from 0.5 to 0.0005, and more preferably from 0.05–0.0005 mols of alkali metal or alkaline earth metal/mol of phosphate are generally used.

The expression "alkali metal" or "alkaline earth metal" relates to the elements, for example Li, Na, K, Ca and Ba, in the basic alkali or alkaline earth metal compounds. When large quantities of alkali or alkaline earth metal are used, the polycondensation is commenced at a particularly low temperature and under only slightly reduced pressure owing to the faster release rate of the alcohol or phenol.

The polyphosphate which is obtained generally contains inonogenic groups. The quantity of these ionogenic groups depends on the quantity of the alkali or alkaline earth metal compound which is used.

During the production of the polyphosphates which may be used according to the present invention, the aromatic diols and the monomeric phosphates are generally used in a molar ratio of from 0.66:1 to 2.3:1. Ratios of from 0.66:1–0.96:1 and from 2.3:1–1.6:1 are preferred, whereas ratios of from 0.75:1–0.96:1 and from 2.2:1–1.6:1 are more preferred, and ratios of from 0.8:1–0.92:1 and from 2.1:1–1.7:1 are most preferred.

The polyphosphates which may be used according to the present invention consist of polymer units corresponding to the formulae (7) and/or (8) and optionally (9) and they contain branching points corresponding to formula (10):

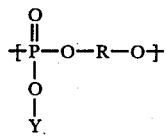
(7)

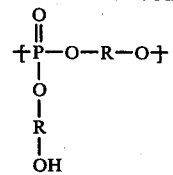
(8)

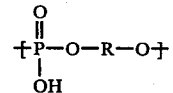
(9)

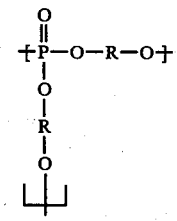
(10)

and end groups coresponding to formulae (11), (12), (13) and optionally corresponding to the formulae (14), (15) and (16).

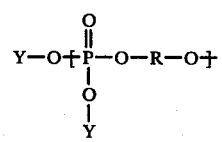
(11)

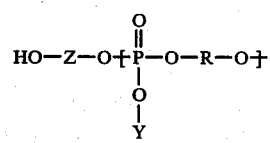
(12)

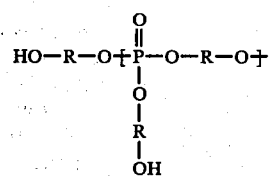
(13)

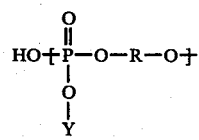
(14)

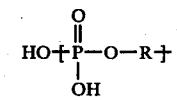
(15)

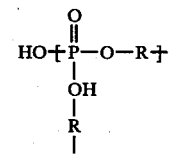
(16)

In the formulae (7) to (16), Y and R are as defined in formulae (2) and (3).

The polymer units corresponding to formula (9) and the end groups corresponding to formulae (14), (15) and

(16) may be present, for example, if alkali metal hydroxides are used as catalysts, or if moisture is not excluded or even if small quantities of H₂O are added.

Polyphosphates which may be used according to this invention generally contain, in addition to the structural units corresponding to the formulae (8), (9), (12), (13), (14), (15) and (16) which contain OH groups, ionic groups, such as $-O^\ominus$ $Me^\oplus$ or $-O^\ominus$ $Me^{\oplus\oplus}$ $^\ominus O-$, ($Me^\oplus$ represents, for example, alkali metal ions, such as $Li^\oplus$, $Na^\oplus$, $K^\oplus$ and $Me^{\oplus\oplus}$ represents, for example, alkaline earth metal ions, such as $Ca^{\oplus\oplus}$ and $Ba^{\oplus\oplus}$.)

The quantity of these ionic groups depends on the quantity of catalyst which is used. Polyphosphates are generally preferred which contain ionogenic groups corresponding to the quantity of catalyst which is preferably used. However, in particular cases, it may be desirable to bring the content of ionogenic groups to a particularly high or a particularly low level. In the first case, particularly large quantities of catalyst are used during polycondensation, whereas in the second case, particularly low quantities of catalyst are used.

The addition of base-binding substances may also influence the content of ionogenic groups and reduce this content. Such base-binding substances include, for example, dialkyl sulphates, such as dimethyl sulphate, diethyl sulphate or organic acids, such as toluene sulphonic acid. These compounds are generally added to the polymer melt in the required quantity towards the end of polycondensation. Thereafter, time is allowed for the reaction of these substances with the ionogenic groups before the end of condensation.

The ratios of the quantity of different structural units corresponding to formulae (7) to (16) in the polyphosphate may be influenced by adjusting specific molar ratios of aromatic diol:phosphate during the polyphosphate synthesis.

These ratios may be of major significance for the respective purpose of use of the polyphosphate. Thus, in the case of the molar ratios of aromatic diol:phosphate of 0.66:1–1.49:1, the structural units corresponding to formulae (7) and (11) generally predominate with respect to the structural units corresponding to formulae (8) and (13), whereas in the case of molar ratios of aromatic diol:phosphate of 1.51–2.3:1, the structural units corresponding to formulae (8) and (13) predominate with respect to the structural units corresponding to formulae (7) and (11).

In the case of the preferred molar raatios of aromatic diol:phosphate of 0.66:1–0.96:1, of the structural units corresponding to the formulae (7), (8), (11), (12) and (13), practically only structural units corresponding to the formulae (7) and (11) may be obtained in the polyphosphate of this invention, and in the case of the preferred molar ratios of aromatic diol:phosphate of from 2.5:1–2.03:1, practically only structural units corresponding to the formulae (8) and (13) may be obtained in the polyphosphate.

In the first case, this means that there are practically no aromatic diol phenolic OH groups in the polyphosphate (for example=0.1%, preferably=0.1% OH of aromatic diol).

In the second case, this means that there is practically the maximum quantity possible of aromatic diol phenolic groups in the polyphosphate. One or the other may be advantageous, depending on the purpose of use.

The degree of polycondensation may be followed by continuously measuring the melt viscosity of the reaction medium.

The polyphosphates which may be used according to the present invention may be viscous or more or less plastic resins at 20° C. They then have glass transition temperatures of below 20° C. They may also preferably be rigid thermoplastic resins which have glass transition temperatures $T_g$ of above 20° C. Those having glass transition temperatures $T_g$ of above 40° C. are particularly preferred, and those having glass transition temperatures of above 60° C, particularly above 70° C., are most preferred.

The polyphosphates which are used in the present invention generally have apparent molecular weights $\overline{M}_w$ (measured by gel chromatography, with bisphenol A-polycarbonate as control) of from 1600 to 150,000, preferably from 2300 to 50,000, more preferably from 3200 to 25,000 and most preferably from 5000 to 20,000.

The average polycondensation degrees $\overline{P}$ of the polyphosphates which are used generally range from 3 to 30, based on the phosphate groups in the polyphosphate. Polycondensation degrees $\overline{P}$ of from 4 to 25 are preferred, whereas polycondensation degrees of from 7 to 20 are particularly preferred.

The relative viscosity of the polyphosphates which are used generally ranges from 1.01–1.20, preferably from 1.02–1.18, and more preferably from 1.03–1.15 (measured in $CH_2Cl_2$, c=0.5 g/l).

Aromatic diols, on which the phosphate units corresponding to formulae (3) and (4) are based, and on which the radicals —R— may also be based, as long as this is not excluded in the preceding text, are the following, for example:
bis-(3,5-dimethylphenyl-4-hydroxyphenyl)-methane,
1,1-bis-(3,5-dimethylphenyl-4-hydroxyphenyl)-ethane,
2,2-bis-(3,5-dimethylphenyl-4-hydroxyphenyl)-propane,
2,2-bis-(3,5-dimethylphenyl-4-hydroxyphenyl)-butane,
2,4-bis-(3,5-dimethylphenyl-4-hydroxyphenyl)-2-methylbutane,
3,3-bis-(3,5-dimethylphenyl-4-hydroxyphenyl)-pentane,
1,1-bis-(3,5-dimethylphenyl-4-hydroxyphenyl)-cyclopentane
1,1-bis-(3,5-dimethylphenyl-4-hydroxyphenyl)-cyclohexane,
bis-(3,5-dimethyl-4-hydroxyphenyl),
bis(3,5-dimethylphenyl-4-hydroxyphenyl)-sulphide, and
α,α'-bis-(3,5-dimethylphenyl-4-hydroxyphenyl)-p-diisopropylbenzene.

The following aromatic diols are preferred: bis-(3,5-dimethyl-4-hydroxyphenyl)-methane, and 2,2-bis-(3,5-dimethyl-4-hydroxyphenyl)-propane.

Of these, 2,2-bis-(3,5-dimethyl-4-hydroxyphenyl)-propane is particularly preferred.

Aromatic diols, on which the phosphate units corresponding to formulae (5) and (6) are based and on which the radicals —R— may generally also be based, as long as this is not excluded by the preceding text, include the following, for example:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
α,α'-bis-(4-hydroxyphenyl)-diisopropylbenzenes,
and nuclear-alkylated compounds thereof, as long as they do not fall within formula (1). These and other suitable aromatic diols corresponding to formula (2) are described in U.S. Pat. Nos. 3,028,365; 2,999,835; 3,148,182; 3,271,368; 2,991,273; 3,271,367; 3,780,087; 3,014,891; 2,999,846; in DE-OS Nos. 2,063,050; 2,211,957; 1,570,703; 2,329,585, 2,329,686, in the monograph "Hermann Schnell, Chemistry and Physics of Polycarbonates, Polymer Reviews, Volume 9, Interscience Publishers New York, 1964" and in other places.

Of these aromatic diols, those are preferred which correspond to the formula (17):

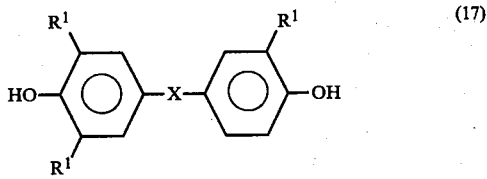

wherein
X is as defined in formula (3), and
$R^1$ represents H or $CH_3$,
and which correspond to formula (18), 1,1,3,4,6-pentamethyl-3-(3,5-dimethyl-4-hydroxyphenyl)-indan-5-ol:

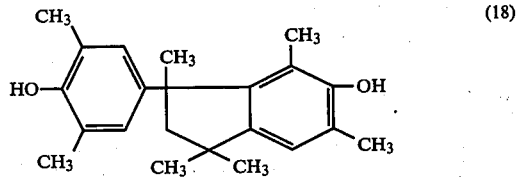

Such preferred aromatic diols corresponding to formula (17) include the following, for example:
2,2-bis-(4-hydroxyphenyl)-propane,
2,2-bis-(4-hydroxyphenyl)-butane,
2,4-bis-(4-hydroxyphenyl)-2-methylbutane,
1,1-bis-(4-hydroxyphenyl)-cyclohexane,
bis-(4-hydroxyphenyl),
bis-(4-hydroxyphenyl)-sulphide,
α,α′-bis-(4-hydroxyphenyl)-p-diisopropylbenzene,
2-(3-methyl-4-hydroxyphenyl)-2-(4-hydroxyphenyl)-propane,
2,2-bis-(3-methyl-4-hydroxyphenyl)-propane,
2-(3,5-dimethyl-4-hydroxyphenyl)-2-(4-hydroxyphenyl)-propane, and
2-(3-methyl-4-hydroxyphenyl)-2-(3,5-dimethyl-4-hydroxyphenyl)-propane.

Of the aromatic diols corresponding to formula (17), those are particularly preferred in which R at least partly represents $CH_3$, but particularly if two methyl groups are in the ortho position to one phenolic OH group, and the aromatic diol corresponding to formula (18) is also preferred.

The ratio of the structural units (3) and (4) to the structural units (5) and (6) in the polyphosphates which are used is at least 1:99 mol %, preferably at least 30:70 mol %, more preferably at least 60:40 mol % and most preferably at least 85:15 mol %, but in particular 100:0 mol %.

Polyphosphates which are based on crude bisphenols are most preferred, as they may be produced from pure 2,6-dimethylphenol and from commercial 2,6-dimethylphenols which are contaminated in particular with cresols, according to the processes of DE-OS Nos. 2,928,464 and 2,928,443.

The phosphoric acid esters which are required for the production of the polyphosphates which may be used according to the present invention correspond to the formula (19):

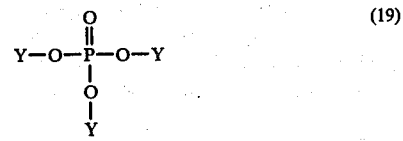

wherein Y represents an alkyl-, cycloalkyl-, aryl- or aralkyl- radical which may be the same or different. The radicals Y represent alkyl, including cycloalkyl, aryl and alkylaryl radicals which may be substituted, for example with halogen.

Examples of such alkyl groups include the following: methyl, ethyl, propyl, butyl, pentyl, hexyl, heptyl, octyl, nonyl, decyl, undecyl, dodecyl and isomers thereof, for example neopentyl, 3,5,5-trimethylhexyl, 3-methylhexyl, 2-ethylhexyl, 2,5,5-trimethylhexyl, also cycloalkyl groups, such as cyclohexyl, haloalkyl, such as 2-chloroethyl and 2,3-dibromopropyl.

Examples of aryl and alkylaryl radicals include phenyl, o, m, p-methylphenyl, 2,6-dimethylphenyl, 2,4-dimethylphenyl, 2,4,6-trimethylphenyl, diphenyl, 2- and 4-isopropylphenyl, nonylphenyl, 4-tert.-butylphenyl, 4-chlorophenyl, 2,4,6-trichlorophenyl, 4-bromophenyl, 2,4,6-tribromophenyl, naphthyl and benzyl.

Of the radicals Y which have been mentioned, the aryl radicals are preferred, in particular the halogen-free aryl radicals. Of these, the phenyl, the o, m, p-methylphenyl and the 2,6-dimethylphenyl radicals are particularly preferred.

Phosphoric acid esters corresponding to formula (19) include the following, for example:
bis-(phenyl)-methylphosphate,
bis-(ethyl)-phenylphosphate,
bis-(ethyl)-2,6-dimethylphenylphosphate,
bis-(phenyl)-ethylphosphate,
tris-(2-chloroethyl)-phosphate,
bis-(phenyl)-2-chloroethylphosphate,
bis-(butyl)-phenylphosphate,
bis-(phenyl)-butylphosphate,
bis-(neopentyl)-phenylphosphate,
bis-(4-methylphenyl)-2-ethylhexylphosphate,
bis-(2-ethylhexyl)-phenylphosphate,
bis-(2-ethylhexyl)-4-methylphenylphosphate,
bis-(phenyl)-2-ethylhexylphosphate,
tris-(octyl)-phosphate,
bis-(phenyl)-octylphosphate,
bis-(octyl)-phenylphosphate,
bis-(3,5,5-trimethylhexyl)-phenylphosphate,
bis-(2,5,5-trimethylhexyl)-4-methylphenylphosphate,
bis-(phenyl)-isodecylphosphate,
bis-(dodecyl)-4-methylphenylphosphate,
bis-(dodecyl)-phenylphosphate,
tris-(phenyl)-phosphate,
tris-(2-methylphenyl)-phosphate,
tris-(4-methylphenyl)-phosphate,
bis-(2-methylphenyl)-phenylphosphate,
bis-(4-methylphenyl)-phenylphosphate,
bis-(phenyl)-2-methylphenylphosphate,
bis-(phenyl)-4-methylphenylphosphate,
tris-(isopropylphenyl)-phosphate,
bis-(isopropylphenyl)-phenylphosphate,
bis-(phenyl)-isopropylphenylphosphate, tris-(nonylphenyl)-phosphate,
tris-(2,6-dimethylphenyl)-phosphate,
bis-(2,6-dimethylphenyl)-phenylphosphate,
bis-(phenyl)-2,6-dimethylphenylphosphate,
bis-(2,6-dimethylphenyl)-4-tert.-butylphenylphosphate,
bis-(2,6-dimethylphenyl)-4-methylphenylphosphate,
bis-(2,6-dimethylphenyl)-4-methylphenylphosphate,
bis-(2,6-dimethylphenyl)-3-methylphenylphosphate,
bis-(2,6-dimethylphenyl)-4-isopropylphenylphosphate, and
bis-(2,6-dimethylphenyl)-2-isopropylphenylphosphate.

Triaryl esters are preferred phosphoric acid esters corresponding to formula (19). Phosphoric acid esters corresponding to formula (19) which are particularly preferred are triaryl esters having three identical aryl esters or having at least two 2,6-dimethylphenyl radicals, such as:
tris-(phenyl)-phosphate,
tris-(2-methylphenyl)-phosphate,
tris-(4-methylphenyl)-phosphate,
tris-(isopropylphenyl)-phosphate,
tris-(2,6-dimethylphenyl)-phosphate,
bis-(2,6-dimethylphenyl)-phenylphosphate,
bis-(2,6-dimethylphenyl)-2-methylphenylphosphate,
bis-(2,6-dimethylphenyl)-4-methylphenylphosphate, and
bis-(2,6-dimethylphenyl)-isopropylphenylphosphate.

Triphenylphosphate and tri-(2,6-dimethylphenyl)-phosphate are particularly preferred triaryl esters.

Basically acting organic or inorganic alkali metal or alkaline earth metal compounds are used as catalysts for the production of the polyphosphates which are used according to the present invention. Such compounds include the following, for example:
metals, for example Li, Na, K, Ca; hydrides, such as LiH, NaH, KH, CaH$_2$; oxides, such as Li$_2$O, Na$_2$O, K$_2$O, CaO, BaO, hydroxides such as LiOH, NaOH, KOH, Ba(OH)$_2$, Sr(OH)$_2$, Ca(OH)$_2$; alkali metal borohydrides, such as NaBH$_4$; amides of the alkali metals, such as Li-, Na- and K-amide; alkali and alkaline earth metal alcoholates, such as methylates, ethylates, propylates, butylates, cyclohexanolates of Li, Na, K or Ca; phenolates, such as the Li-, Na- and K salts of phenol, o, m, p-cresol, or 2,6-dimethylphenol; bis-alkali metal salts of aromatic dihydroxy compounds, such as the Li, Na- and K salts of 2,2-bis-(4-hydroxyphenyl)-propane, or of 2,2-bis-(3,5-dimethyl-4-hydroxyphenyl)-propane.

The alkali metal compounds are preferred, and of these, the Na and K compounds are preferred. The hydroxides, alcoholates, phenolates and bisphenolates are particularly preferred thereof. Na phenolate is most preferred.

According to the present invention, compounds which contain only aromatically bound chlorine or bromine, which have decomposition temperatures of above 250° C. and which do not boil under normal pressure up to at least 300° C. are used as organic chlorine and/or bromine compounds.

Chlorine and bromine compounds which are preferably used include the following, for example:
(1) chlorinated and brominated diphenyls, such as octachlorodiphenyl, decachlorodiphenyl, octabromodiphenyl and decabromodiphenyl.
(2) Chlorinated and brominated diphenyl ethers, such as octa- and decachlorodiphenyl ether and octa- and decabromodiphenyl ether.
(3) Chlorinated and brominated phthalic acid anhydride and derivatives thereof, such as phthalimides and bisphthalimides, for example tetrachloro- and tetrabromophthalic acid anhydride, tetrachloro and tetrabromophthalimide, N-methyltetrachloro- and N-methyltetrabromophthalimide, N,N'-ethylene bis-tetrachloro- and N,N'-ethylene-bis-tetrabromophthalimide.
(4) Chlorinated and brominated bisphenols, such as 2,2-bis-(3,5-dichloro-4-hydroxyphenyl)-propane and 2,2-bis-(3,5-dibromo-4-hydroxyphenyl)-propane.
(5) 2,2-bis-(3,5-dichloro-4-hydroxyphenyl)-propane-oligocarbonate and 2,2-bis-(3,5-dibromo-4-hydroxyphenyl)-propane-oligocarbonate having an average polycondensation degree of from 2 to 20.
(6) Chlorinated and brominated polystyrene.
(7) Chlorinated and brominated polyphenylene oxide.

Of these aromatic chlorine and bromine compounds, the bromine compounds are preferred.

Of the preferred aromatic bromine compounds, decabromodiphenyl ether, N,N'-ethylene-bis-tetrabromophthalimide and 2,2-bis-(3,5-dibromo-4-hydroxyphenyl)-propane-oligocarbonate are particularly preferred.

Commercial polytetrafluoroethylene may be used according to the present invention, advantageously in a pulverulent, finely-divided form.

Polycarbonate contents of from 25 to 99.5% by weight, preferably from 50 to 98% by weight, more preferably from 60 to 93% by weight and most preferably from 65 to 90% by weight are used in the flame-resistant polymer mixtures of the present invention.

The contents of polyphosphate in the flame-resistant polymer mixtures of this invention are from 0.5 to 75% by weight, preferably from 2 to 50% by weight more preferably from 7 to 40% by weight and most preferably from 10 to 30% by weight.

The designation "% by weight" relates to the components polycarbonate and polyphosphate and thus they are supplemented to 100% by weight.

The chlorine or bromine compounds as additives are used in amounts up to 20 parts per hundred, preferably 0.5 to 10 parts and more preferably 1–7 parts.

The glass fibres are added in amounts of from 0 to 100 parts, preferably from 10 to 80 parts and more preferably from 20 to 70 parts.

Polytetrafluoroethylene is added up to 1 part, preferably 0.01–0.5 parts and more preferably 0.05–0.2 parts.

The polymer mixtures according to the present invention exhibit a good resistant to fire and a low dripping tendency while burning. They may be processed thermoplastically and are stable in processing and flowable in the melt. The processing stability is expressed, for example, by a low tendency towards discolouration and the release of gases, so that no discolourations or streaks are observed on the mouldings, even at an elevated processing temperature. The surface quality is good and the electrostatic charging ability is low.

The polymer mixtures according to the present invention may also be advantageously processed via their solution. Films, for example, may be produced in this manner.

Other advantageous properties of the polymer mixtures of the present invention include their high thermal stability, hydrolysis stability, possible transparency and merging joint line strength. Furthermore, they may be printed effectively and exhibit a good adhesion, for example, to smooth surfaces, such as to metals.

The outstanding properties of the flame-resistant polymer mixtures of the present invention are conditioned to some extent by the fact that the polycarbonates which may be used according to the present invention and branched polyphosphates are surprisingly compatible. The compatibility extends so far that particularly the branched polyphosphates which have been mentioned as being preferred produce monophasic mixtures with the polycarbonates of the present invention, so that transparency is obtained. This transparency may also be retained by the addition of Cl or Br-containing compounds, for example during the addition of decabromodiphenylether.

The flame-resistant polymer mixtures of the present invention may be processed into mouldings, plates, films, fibres, coatings and many other articles. They may be used in mixtures with fillers and reinforcing materials, such as minerals and glass fibres, carbon black, dyes and pigments, stabilizers, lubricants and mould-release auxiliaries. They are particularly advantageous in areas where properties of a high flame-resistance with a high thermal stability, a high rigidity, a good hydrolysis stability, a high surface quality and good electrically insulating properties are important. Thus, they may be used, for example, for the production of component parts for electrically operated devices, such as housings or housing parts and insulators, for current-carrying parts, or for the production of component parts in cars, for example coverings, dashboards, and component parts in the engine compartment.

(c) MPO 2,2-bis-(3,5-dimethyl-4-hydroxyphenyl)-propane-polyphosphate, produced from 2,2-bis-(3,5-dimethyl-4-hydroxyphenyl)propane and triphenylphosphate (ratio 0.91:1) with Na-phenolate as catalyst, $\eta$ rel=1.07 (in $CH_2Cl_2$, c=5 g/l), glass transition temperature $T_g=84°$ C.

(d) GV

Short glass fibres.

(e) DBDPE

Decabromodiphenylether.

(f) PTFE

Polytetrafluoroethylene, finely-divided.

Examples 2-6

Flame-resistant polymer mixture

Flame-resistant polymer mixtures were obtained using a double shaft extruder from polycarbonates, polyphosphates and additives, as stated in the Table for Examples 2-6, at 300° C. The Comparative Polycarbonate, Example 2, without additives was also extruded once. The MPC-CRUDE and the MPO of Example 5 were pre-mixed via a dichlorobenzene solution and vacuum extrusion, while extracting the chlorobenzene. The resulting polymer mixtures were processed via the melt into test bodies, and were tested. The results which were obtained are provided in the Table for Examples 2-6.

TABLE

Examples 2-7: flame-resistant polymer mixtures

Flame-resistant polymer mixtures

| Ex. | Composition %/parts per hundred | Properties flame-resistance UL Subj. 94 1/16" | Dimensional stability under heat Vicat B (°C.) | Hydrolysis in aqueous NaOH 10%, 400 h, 100% |
|---|---|---|---|---|
| 2 | MPC 100% | f | 197 | n |
| 3 | MPC:MPO:PTFE 95%:5%:0.2 parts | VI | 190 | n |
| 4 | MPC:MPO:GV PTFE 95%:5%:45 parts:0.2 parts | VO | 193 | n |
| 5 | MPC-CRUDE:MPO:PTFE 66%:34%:0.45 parts | VO | 159 | n |
| 6 | MPC:MPO:DBDPE:PTFE 95%:5%:3 parts:0.1 parts | VO | 189 | n |

Parts per hundred = parts of additive per hundred parts of polycarbonate and polyphosphate
f = failed;
n = not attacked;
VO, VI = Flame-resistance classes.

EXAMPLES

Example 1

Substances used in the Examples

(a) MPC 2,2-bis-(3,5-dimethyl-4-hydroxyphenyl)-propane-polycarbonate, $\eta$ rel=1.332 (in $CH_2Cl_2$, c=5 g/l).

(b) MPC-CRUDE

Polycarbonate from a crude bisphenol with 96% by weight of 2,2-bis-(3,5-dimethyl-4-hydroxyphenyl)-propane, less than 0.1% by weight of 2,6-dimethylphenol and 4.9% by weight of unspecified components (crude bisphenol obtained according to DE-OS No. 2,928,464, Example 1), $\eta$ rel=1.621 (in $CH_2Cl_2$, c=5 g/l).

We claim:
1. Flame-resistant polymer mixtures, characterized in that they contain
(a) from 25 to 99.5% by weight of a polycarbonate having a weight average molecular weight of from 10,000 to 200,000 and comprises the linear chains of at least 85 mol % of recurring structural units corresponding to formula (1):

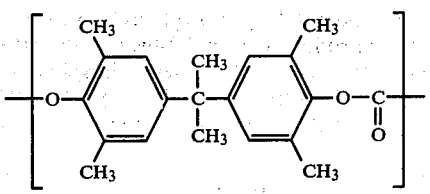
(1)

and at most 15 mol % of recurring units corresponding to formula (2):

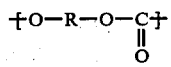
(2)

wherein —R— represents an o-, m- or p-phenyl radical or a radical of the formula (2a)

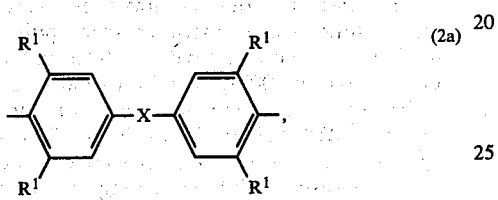
(2a)

in which
$R^1$ represents hydrogen, halogen, or $C_1$–$C_3$-alkyl and
X represents a $C_1$–$C_5$-alkylene- or alkylidene radical, a $C_3$–$C_6$-cycloalkylene- or cycloalkylidene-radical, a single bond, —S— or a radical of the formula (2b)

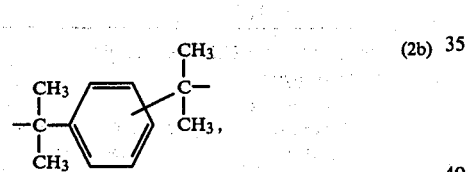
(2b)

or a radical of the formula (2c)

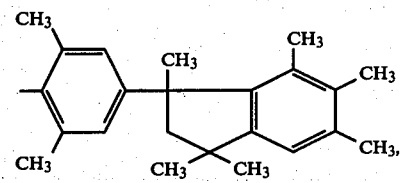
(2c)

in which the two alkyl substituents may be in o-, m- or p-position to each other, with the proviso that units of formula (1) are not comprised;
(b) from 0.5 to 75% by weight of a branched polyphosphate having a glass transition temperature from below 20° C. to above 70° C. and apparent molecular weights of from 1,600 to 150,000 which has at least 1 mol % of recurring structural units corresponding to the formulae (3) and/or (4):

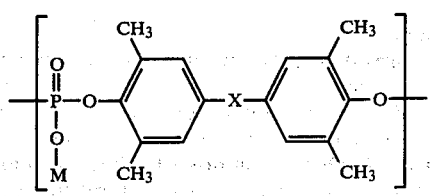
(3)

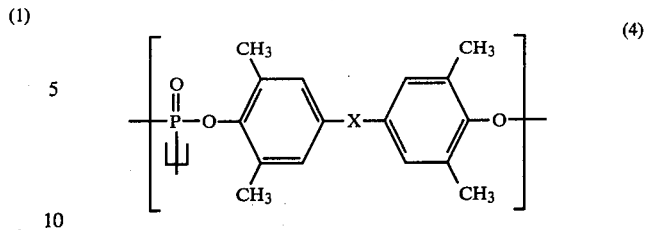
(4)

wherein X represents a $C_1$–$C_5$ alkylene or alkylidene radical, a $C_5$–$C_6$ cycloalkylene or cycloalkylidene radical, a single bond, —S— or

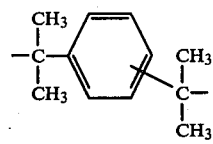

wherein
the two i-propylidene groups may be in the o, m, p-position relative to each other,
M represents H, Y or —R—OH, and the H of the OH groups may be at least partly replaced by metal atoms which form ionogenic groups, wherein
Y represents an alkyl-, cycloalkyl-, aryl- or arylkyl-radical and
R is as defined above,
and at most 99 mol % of recurring structural units corresponding to formulae (5) and/or (6):

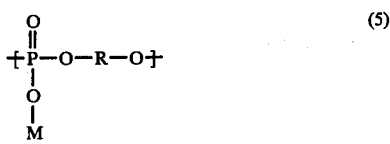
(5)

(6)

wherein R and M are as defined above,
(c) from 0 to 20 parts per hundred (all parts by weight) of one or more organic chlorine and/or bromine compounds which contain only aromatically bound chlorine or bromine or both, have a decomposition temperature of above 250° C. and do not boil under normal pressure up to at least 300° C.,
(d) from 0 to 20 parts of glass fibres, and
(e) from 0 to 1 part of polytetrafluoroethylene.

2. Flame-resistant polymer mixtures according to claim 1 wherein the polycarbonate has a weight average molecular weight of from 20,000 to 80,000.

3. Flame-resistant polymer mixtures according to claim 1 wherein the polycarbonate has a weight average molecular weight of from 25,000 to 60,000.

4. Flame-resistant polymer mixtures according to claim 1 wherein the polycarbonate has a weight average molecular weight of from 30,000 to 45,000.

5. Flame-resistant polymer mixtures according to claim 1 wherein the polyphosphate has an apparent molecular weight of 2,300 to 50,000.

6. Flame-resistant polymer mixtures according to claim 1 wherein the polyphosphate has an apparent molecular weight of 3,200 to 25,000.

7. Flame-resistant polymer mixtures according to claim 1 wherein the polyphosphate has an apparent molecular weight of 5,000 to 20,000.

* * * * *